United States Patent [19]
Friedrich et al.

[11] Patent Number: 5,648,772
[45] Date of Patent: Jul. 15, 1997

[54] CONTROL CONSOLE FOR A PROGRAM-CONTROLLED MACHINE TOOL

[75] Inventors: Wilfried Friedrich, Seeg; Manfred Kuisel, Jungholz, both of Germany

[73] Assignee: Deckel Maho GmbH, Pfrenten, Germany

[21] Appl. No.: 585,241

[22] Filed: Jan. 11, 1996

[30] Foreign Application Priority Data

Jan. 11, 1995 [DE] Germany .................. 295 00 386.3

[51] Int. Cl.$^6$ ................................................ H03K 17/94
[52] U.S. Cl. ........................................ 341/22; 400/476
[58] Field of Search .................... 341/20, 22, 23, 341/35; 345/168; 364/474.22, 708.1, 709.01, 709.08, 709.1, 709.12; 400/473, 476, 496

[56] References Cited

U.S. PATENT DOCUMENTS

| | | | |
|---|---|---|---|
| 4,316,082 | 2/1982 | Fritz | 235/146 |
| 4,326,193 | 4/1982 | Markley et al. | 341/22 |
| 4,330,776 | 5/1982 | Dennison, Jr. et al. | 341/22 |
| 5,336,002 | 8/1994 | Russo | 400/476 |
| 5,376,934 | 12/1994 | Savazzi | 341/22 |

FOREIGN PATENT DOCUMENTS

| | | | |
|---|---|---|---|
| 2521893 | 8/1983 | France | B23Q 11/00 |
| 1515428 | 8/1969 | Germany . | |
| 1804987 | 6/1970 | Germany . | |
| 2631706 | 1/1978 | Germany | H02B 15/00 |
| 2742366 | 3/1979 | Germany | H02B 1/12 |
| 264791 | 2/1989 | Germany | H02B 1/08 |
| 8806294 | 10/1989 | Germany | H02B 15/00 |
| 3838401 | 5/1990 | Germany | G06F 3/00 |
| 4125137 | 2/1993 | Germany | H01B 15/00 |

Primary Examiner—Jeffery Hofsass
Assistant Examiner—Andrew Hill
Attorney, Agent, or Firm—Baker, Maxham, Jester & Meador

[57] ABSTRACT

A control console for a program-controlled machine tool consisting of a base, an ergonomically positioned control panel including a plurality of function keys, and a display screen. The control panel and the display screen are provided in a common control console housing. In a recess of the housing a plurality of separate control panels is provided, which can be alternatively positioned with respect to the control surface of the control console housing. The functional elements of those control panels are connectable to the associated elements in the control console via electric connectors.

14 Claims, 1 Drawing Sheet

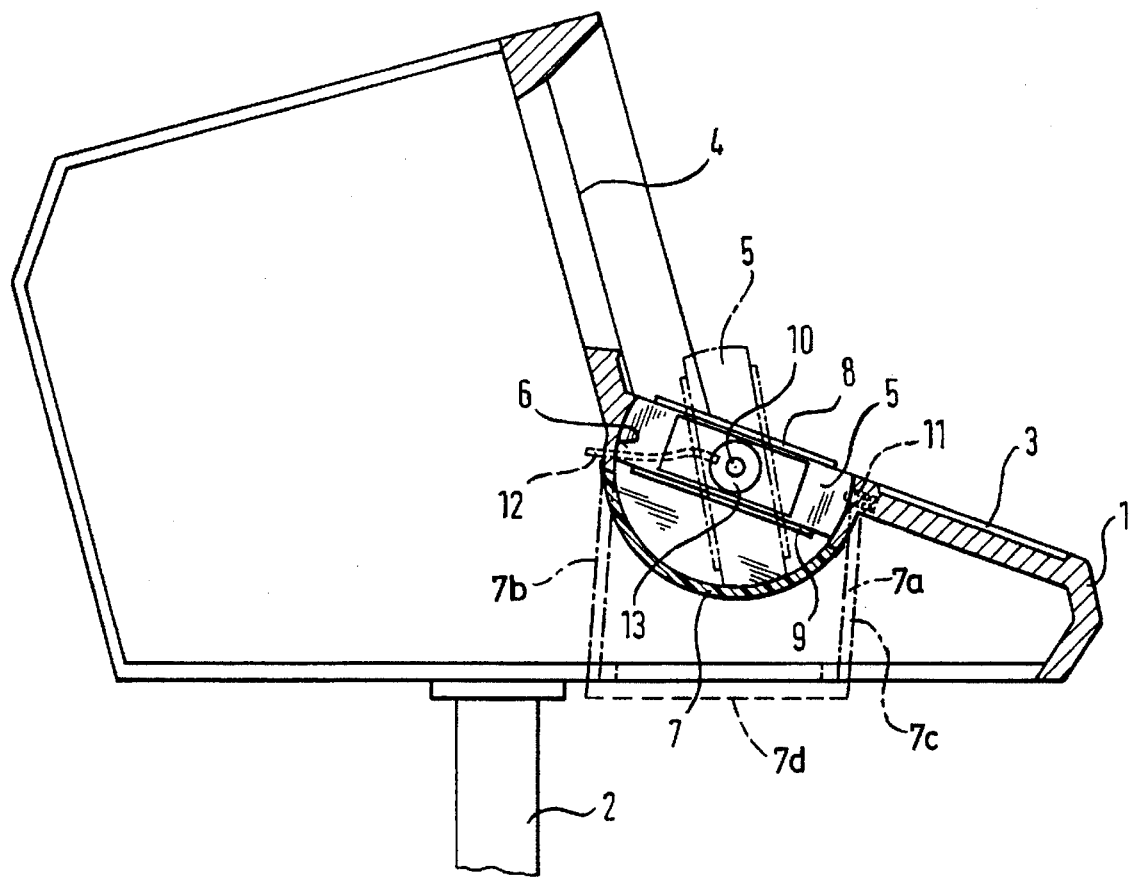

CONTROL CONSOLE FOR A PROGRAM-CONTROLLED MACHINE TOOL

BACKGROUND

1. Field of the Invention

The invention relates to a control console for a program-controlled machine tool comprising a base, an ergonomically located control panel including changeable control panels, a plurality of function keys, and a display screen, the control panel and the display being arranged in a common housing.

2. Discussion of the Related Art

Modern program-controlled machine tools, particularly milling and drilling machines, are generally provided within a control console being located laterally adjacent to the machine and consisting of a base usually being movably hinged to the machine housing, one or more control panels including a plurality of function keys and a display screen standing almost upright. For optical reasons as well as reasons of space, the control panels and the display screen are usually accommodated in a common housing together with their electronic elements. The large number of different multiaxis machining possibilities has made the provision of an increased number of function keys on the control panel necessary, particularly in freely programmable machine tools and work stations so that, accordingly, the dimensions of the control panel have had to be made larger. The plurality of function keys, displays, etc., in connection with the relatively large dimensions of the control panel, however, made the operation complicated and affected the clearness of the control panel.

From U.S. Pat. No. 4,316,082 a computer console is known, in the rear part of the work table top of which a display screen is located, and in the front part of which a fixedly mounted user keyboard is provided. Under the table top a further keyboard is provided in a standby position, which can be positioned in front of the front edge of the table top when needed. A similarly designed control console for machining and measuring machines is shown in German patent publication 41 25 137.

According to German patent publication 38 38 401, a data processing device provided with a control panel designed as a separate control module is described, which is inserted in a vertical front chamber of the data processing device. In operation, the module may be positioned in an inclined operating position as well as a vertical position.

SUMMARY OF THE INVENTION

It is an object of the invention to provide a control console for machine tools which enables the provision of an increased number of function keys on a control panel in combination with relatively small dimensions and an ergonomic operability.

According to the invention, this object is achieved by providing a plurality of separate control panels which can be alternatively positioned in a recess provided in a control surface of the control console housing, the operational elements of which can be connected to the associated elements in the control console via electric connectors.

An embodiment of the invention, which is particularly suitable with respect to handling and dimensions, is characterized in that two control panels are provided on the upper and bottom surfaces of a preferably flat rectangular box or frame being borne in the recess of the housing while being pivotable between two stable positions. This form of the control panel enables the accommodation of about double the number of function keys. Suitably, the function keys, with the aid of which functionally similar operations of the machine tool are activated, are provided in both the control panels, so that the control console just occasionally needs to be pivoted from one of its stable positions to the other. In each position, the box-shaped housing is independent and fixable, for example, by spring-loaded catches, and in the range of its front side bearing tappets switches connected to the function keys via electric lines may be provided, which cooperate with respective switches in the housing in either stable position of the box-shaped housing and form the electric connections between the function keys and the allocated electronic elements of the control. As the electric connectors, flexible cables, such as the ones being used in telephones as so called helix cables, can be used as well.

According to a suitable constructive embodiment of the invention, a basin having an approximately semicircular cross section is formed in a recess in the front part of the control console housing, which basin is limited by the two side walls of the control console housing on the front side. In those front walls the bearing tappets of the box-shaped housing as well as the electrical switching connectors for coupling the respective energy and control lines are located. By arranging the box-shaped housing provided with the double sided control panels in a basin being closed, for example, by a bottom part, contamination of the interior space of the control console housing is avoided. Instead of a basin, a shaft (i.e. an open channel) may be provided.

BRIEF DESCRIPTION OF THE DRAWING

The objects, features and advantages of the invention will be more readily perceived from the following detailed description, when read in conjunction with the single drawing FIGURE showing a sectional view of the control console of the invention.

DETAILED DESCRIPTION OF THE PREFERRED EMBODIMENTS

The control console of the invention comprises housing 1 mounted on base 2. In the front part of the control console housing is located a fixedly mounted plane control panel 3 extending toward the front. Control panel 3 comprises a main keyboard and is provided with basic function keys for controlling the basic operations of machine tools which are coupled to the control console, and is further provided with optical displays if necessary. Further, display screen 4 is provided in the upper part of the control console housing in a known manner.

As shown, box-shaped housing or frame 5 is provided in front of display screen 4 and behind control panel 3 in basin or recess 6 of housing 1, limited by detachably connected, basin-shaped bottom cover or surface 7 and plane side walls. Instead of this basin-shaped cover, open channel 7c may be provided, through which possible dirt particles will pass. This channel is defined by front transverse wall 7a and rear transverse wall 7b and is closed at the bottom by removable cover plate 7d. Inspection, cleaning and assembly are facilitated by channel 7c upon removal of cover plate 7d. Frame 5 is provided on its upper surface and on its bottom surface with additional control panels 8 and 9 respectively, these two control panels being provided with a set of special function keys for controlling special machine tool operations. On the opposite side walls of box-shaped housing 5 central bearing tappets 10 are mounted, with the aid of which housing 5 can be turned, from the shown position, around its central horizontal axis by a half rotation using, for example, a laterally protruding hand wheel (not shown). Of course, the rotation of frame 5 could be mechanized if desired. After such rotation, the previously lower control panel 9 is located in the operational position accessible from above. For securing either of the stable positions of box-shaped housing 5 in the control console housing a detent mechanism or lock is provided, which may be suitably shaped and has the form of a spring-loaded ball catch 11. To electrically connect the function keys of either control panel 8 or 9 to lines 12 located in control console housing 1, switch arrangement 13 is provided in the area of at least one bearing tappet 10, which switch arrangement may contain segmented slip rings or switching fingers being connected to the respective function keys of the respective control panel 8,9 via control lines, and contacting associated fixedly located switching members on the end of control line 12 in the respective stable positions. A technically simpler electric connection comprises the usage of a twistable cable, i.e., a so-called helix cable, which makes slip ring contacts and switches superfluous. As illustrated in the sole drawing FIGURE, control panel 3, display screen 4 and additional control panels 8 and 9 are ergonomically arranged in housing 5 for ease of operation and enabling operational control from a single forward looking position.

The invention is not limited to the illustrated embodiment. Thus, instead of the approximately rectangular frame or housing 5, for example, a housing with a triangular cross section having a total of three control panels can be pivotably mounted in the recess of the control console housing in the illustrated or another position. The important factor is that the comfortable and ergonomically optimized operability of the function keys of the respective control panels is maintained.

A further advantageous embodiment of the invention may comprise a plurality of box-shaped housings having only one or both control panels replaceably mounted in the control console housing. This arrangement provides the advantage that different control panels may be used with identical control boards for different machine types. Further, the application and programming features of the machine control can be enhanced in a simple manner by providing each machine or each control console with a plurality of box-shaped housings having suitable control panels, which may be exchanged in the control console according to the demanded application. The different functional elements, such as keys, displays, and the like, should be arranged on each control panel such that complete operations may be carried out without changing the respective control panel.

What is claimed is:

1. A control console for a program-controlled machine tool, the console comprising:
    a base;
    a control console housing mounted on said base;
    an ergonomically arranged, fixed first control panel mounted on a control surface of said housing, said first control panel comprising a main keyboard and having a plurality of basic function keys for controlling basic machine tool operations;
    a display screen mounted to said housing; and
    a plurality of separate selectively accessible, movable second control panels interchangeably provided on a frame in a recess located in the control surface of said control console housing between said display screen and said main keyboard, said second control panels having a set of special function keys for controlling special machine tool operations, the functional elements of said special function keys of said second control panels being connectable to associated elements in the control console by means of electric connectors;
    whereby said display screen, main keyboard and second control panels are ergonomically arranged in said housing for ease of operation and enabling operational control from a single forward looking position.

2. The control console recited in claim 1, wherein said frame is pivotably mounted in said control surface of said control console housing, said frame being provided, on each upper and bottom surface, with a said second control panel having function keys, respectively, and is securable in the control console housing in a respective stable operating position with one of said second control panels being selectively operatively accessible.

3. The control console recited in claim 2, and further comprising two diametrically opposed bearing tappets mounted on said frame, said bearing tappets being pivotably borne in associated counter bearings in said control console housing.

4. The control console recited in one of claims 1 to 3, and further comprising a spring loaded lock means for selectively securing said frame in one of its stable operating positions.

5. The control console recited in one of claims 2 or 3, and further comprising switching elements located in said frame to which said function keys of said respective second control panels are connected via electric lines, said switching elements electrically contacting associated switches mounted on said control console housing in either stable position of said frame.

6. The control console recited in claim 1, and further comprising:
    function keys on said control panels;
    switching elements in said frame;
    electric lines connected between said function keys and said switching elements; and
    switches mounted on said control console housing to which said switching elements make electrical contact when said second control panels are in either interchangeable position.

7. The control console recited in claim 4, and further comprising switching elements located in said frame to which said function keys of said respective second control panels are connected via electric lines, said switching elements electrically contacting associated switches mounted on said control console housing in either stable position of said frame.

8. The control console recited in one of claims 2 or 3, wherein said functional elements of said second control panels are connected to said associated elements in said control console via a central twistable cable.

9. The machine tool recited in either claim 4, wherein said functional elements of said second control panels are connected to said associated elements in said control console via a central twistable cable.

10. The control console recited in one of claims 1 or 2, and further comprising:
    a bottom basin-shaped surface in said recess in said control console housing; and
    bearing tappets on opposite sides of said frame coupled to counter bearing means on opposite sides of said basin to facilitate pivoting of said frame on said control console housing within said recess.

11. The control console recited in claim 3, and further comprising a bottom basin-shaped surface formed in said recess of said control console housing, said frame being pivotably mounted to said control console housing within said recess by means of said bearing tappets and said counter bearings.

12. The control console recited in claim 4, and further comprising:

a bottom basin-shaped surface in said recess in said control console housing; and bearing tappets on opposite sides of said frame coupled to counter bearing means on opposite sides of said basin to facilitate pivoting of said frame on said control console housing within said recess.

13. The control console recited in claim 3, and further comprising a channel formed under said recess in said control console housing, said bearing tappets of said frame being borne on the walls of said channel, said frame being pivotable with respect to said walls.

14. The control console recited in either of claims 1 or 2, wherein said frame is removably and exchangeably provided in said control console housing.

* * * * *